(12) United States Patent
Bakan

(10) Patent No.: US 12,741,458 B2
(45) Date of Patent: Sep. 22, 2026

(54) METHOD OF MANUFACTURING A COMPONENT OF AN ELECTRIC MOTOR

(71) Applicant: Schaeffler Technologies AG & Co. KG, Herzogenaurach (DE)

(72) Inventor: Murat Bakan, Canton, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 246 days.

(21) Appl. No.: 18/616,468

(22) Filed: Mar. 26, 2024

(65) Prior Publication Data

US 2025/0303686 A1 Oct. 2, 2025

(51) Int. Cl.

| | |
|---|---|
| ***B32B 37/12*** | (2006.01) |
| ***B32B 7/12*** | (2006.01) |
| ***B32B 15/01*** | (2006.01) |
| ***B32B 38/00*** | (2006.01) |
| ***B32B 38/04*** | (2006.01) |

(52) U.S. Cl.

CPC ............ *B32B 37/1284* (2013.01); *B32B 7/12* (2013.01); *B32B 15/01* (2013.01); *B32B 38/0004* (2013.01); *B32B 2037/1269* (2013.01); *B32B 2038/042* (2013.01)

(58) Field of Classification Search

None

See application file for complete search history.

(56) References Cited

U.S. PATENT DOCUMENTS 4,548,992 A * 10/1985 Doi ............................ C09J 4/06 525/169
5,328,947 A * 7/1994 Taguchi ..................... C09J 4/00 526/318.41
5,385,958 A * 1/1995 Bachmann ................ C09J 4/00 522/170

(Continued)

FOREIGN PATENT DOCUMENTS

EP 2826136 B1 12/2019
JP 2006334648 A 12/2006

(Continued)

OTHER PUBLICATIONS

Henkel Corporation, "Loctite® AA 331 Technical Data Sheet," Dec. 2020, 3 pages.

(Continued)

*Primary Examiner* — John Vincent Lawler
(74) *Attorney, Agent, or Firm* — Price Heneveld LLP

(57) ABSTRACT

A method of manufacturing a component of an electric motor includes the steps of: applying a plurality of doses of adhesive to a first side of a metal sheet, wherein the adhesive is an acrylic adhesive that contains at least one of butadiene rubber toughener and polyurethane methacrylate; applying a plurality of doses of activator to a second side of the metal sheet opposite the first side; and cutting out a plurality of metal laminations from the metal sheet, each of which includes a dose of adhesive on the first side of the lamination and a dose of activator on the second side of the lamination, such that the plurality of metal laminations are stacked (Continued)

within a choke and each metal lamination is adhered to at least one adjacent metal lamination by the adhesive activated by the activator.

20 Claims, 3 Drawing Sheets

(56) References Cited

U.S. PATENT DOCUMENTS

| | | | | |
|---|---|---|---|---|
| 2006/0240257 | A1* | 10/2006 | Schwantes | B32B 27/286 428/402.2 |
| 2016/0264823 | A1* | 9/2016 | Schümann | C09J 7/40 |
| 2021/0273538 | A1 | 9/2021 | Blocher et al. | |
| 2022/0051838 | A1* | 2/2022 | Bursy | H01F 3/02 |
| 2022/0052570 | A1* | 2/2022 | Takeda | H02K 1/12 |
| 2022/0410499 | A1 | 12/2022 | Kay | |
| 2023/0396136 | A1* | 12/2023 | Premoli | B21D 28/06 |

FOREIGN PATENT DOCUMENTS

| | | | | |
|---|---|---|---|---|
| WO | 2021119969 | A1 | 6/2021 | |
| WO | WO-2024052519 | A1 * | 3/2024 | B32B 37/20 |

OTHER PUBLICATIONS

Henkel Corporation, "Loctite® SF 7387™ Technical Data Sheet," May 2015, 2 pages.
Permabond Engineering Adhesives, "Permabond® Initiator 41 Technical Datasheet," Feb. 18, 2016, 1 page.
Permabond Engineering Adhesives, "Permabond® TA439 Technical Datasheet," Feb. 23, 2018, 2 pages.

* cited by examiner

METHOD OF MANUFACTURING A COMPONENT OF AN ELECTRIC MOTOR

FIELD OF THE DISCLOSURE

The present disclosure generally relates to a method of manufacturing a component of an electric motor. More specifically, the present disclosure relates to components of an electric motor that include stacked laminations that are adhered to each other by an adhesive, and a method for manufacturing components of an electric motor by adhering laminations to each other via an adhesive.

BACKGROUND OF THE DISCLOSURE

Components of electric motors, such as stator cores and rotors, can be formed of stacks of laminations. The laminations can be fixed to each other via a plurality of methods including interlocking, laser welding, and by utilization of adhesives.

SUMMARY OF THE DISCLOSURE

According to a first aspect of the present disclosure, a method of manufacturing a component of an electric motor includes the steps of: applying a plurality of doses of adhesive to a first side of a metal sheet, wherein the adhesive is an acrylic adhesive that contains at least one of butadiene rubber toughener and polyurethane methacrylate; applying a plurality of doses of activator to a second side of the metal sheet opposite the first side; and cutting out a plurality of metal laminations from the metal sheet, each of which includes a dose of adhesive on the first side of the lamination and a dose of activator on the second side of the lamination, such that the plurality of metal laminations are stacked within a choke and each metal lamination is adhered to at least one adjacent metal lamination by the adhesive activated by the activator.

Embodiments of the first aspect of the disclosure can include any one or a combination of the following features:

the first side of the sheet metal faces downward, and the second side of the sheet metal faces upward;

the adhesive contains polyurethane methacrylate in an amount of from about 1 to about 30 percent by weight;

the adhesive contains polyurethane methacrylate in an amount of from about 10 to about 30 percent by weight;

the adhesive contains polyurethane methacrylate in an amount of from about 20 to about 30 percent by weight;

the adhesive contains polyurethane methacrylate in an amount of about 30 percent by weight;

the adhesive contains butadiene rubber toughener in an amount of from about 1 to about 20 percent by weight;

the adhesive contains butadiene rubber toughener in an amount from about 10 to about 20 percent by weight;

the adhesive contains butadiene rubber toughener in an amount of about 20 percent by weight;

the component of the electric motor is at least a portion of a rotor; and the component of the electric motor is at least a portion of a stator core.

According to a second aspect of the present disclosure, a component of an electric motor includes a plurality of stacked metal laminations, and adhesive that adheres adjacent metal laminations to each other. The adhesive is an acrylic adhesive that contains butadiene rubber toughener in an amount of from about 1 to about 20 percent by weight.

Embodiments of the second aspect of the disclosure can include any one or a combination of the following features:

the adhesive contains butadiene rubber toughener in an amount from about 10 to about 20 percent by weight;

the adhesive contains butadiene rubber toughener in an amount of about 20 percent by weight;

the adhesive contains polyurethane methacrylate in an amount of from about 1 to about 30 percent by weight;

the component of the electric motor is a stator core; and the component of the electric motor is a rotor.

According to a third aspect of the present disclosure, a component of an electric motor includes a plurality of stacked metal laminations, and adhesive that adheres adjacent metal laminations to each other. The adhesive is an acrylic adhesive that contains polyurethane methacrylate in an amount of from about 1 to about 30 percent by weight.

Embodiments of the third aspect of the disclosure can include any one or a combination of the following features:

the adhesive contains polyurethane methacrylate in an amount of from about 10 to about 30 percent by weight; and the adhesive contains polyurethane methacrylate in an amount of from about 20 to about 30 percent by weight.

These and other features, advantages, and objects of the present disclosure will be further understood and appreciated by those skilled in the art by reference to the following specification, claims, and appended drawings.

Figure 1:
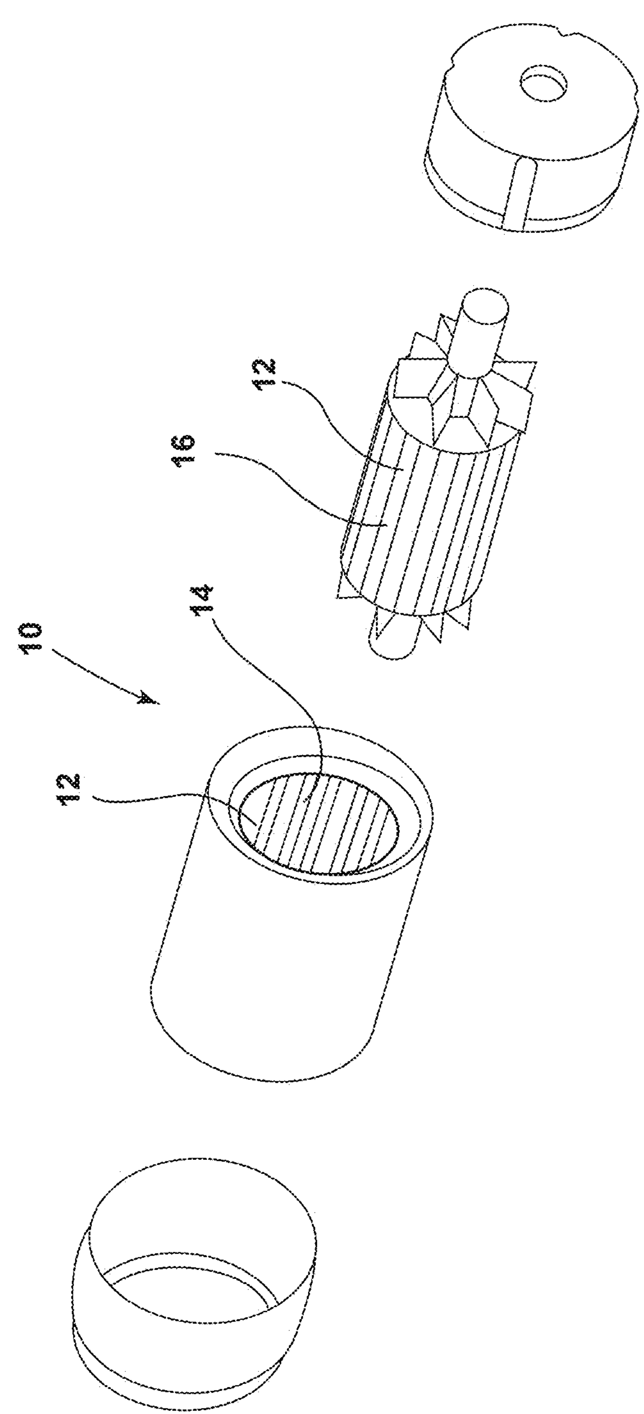
FIG. 1 is an exploded perspective view of an electric motor, illustrating a stator core and a rotor that is configured to be assembled with the stator core, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

The amounts of ingredients of a composition may be indicated by percent by weight (or "percent wt." or "wt.-percent"), unless specified otherwise. The total amount of all ingredients gives 100 percent by weight, unless specified otherwise.

Referring now to FIG. 1, an electric motor 10 is illustrated. The electric motor 10 includes a plurality of components 12. For example, as illustrated in FIG. 1, the electric motor 10 includes a stator core 14 and a rotor 16. The stator core 14 and the rotor 16 may be formed of a plurality of laminations 18 that are in a stacked configuration and coupled to each other, as described further herein.

Figure 2:
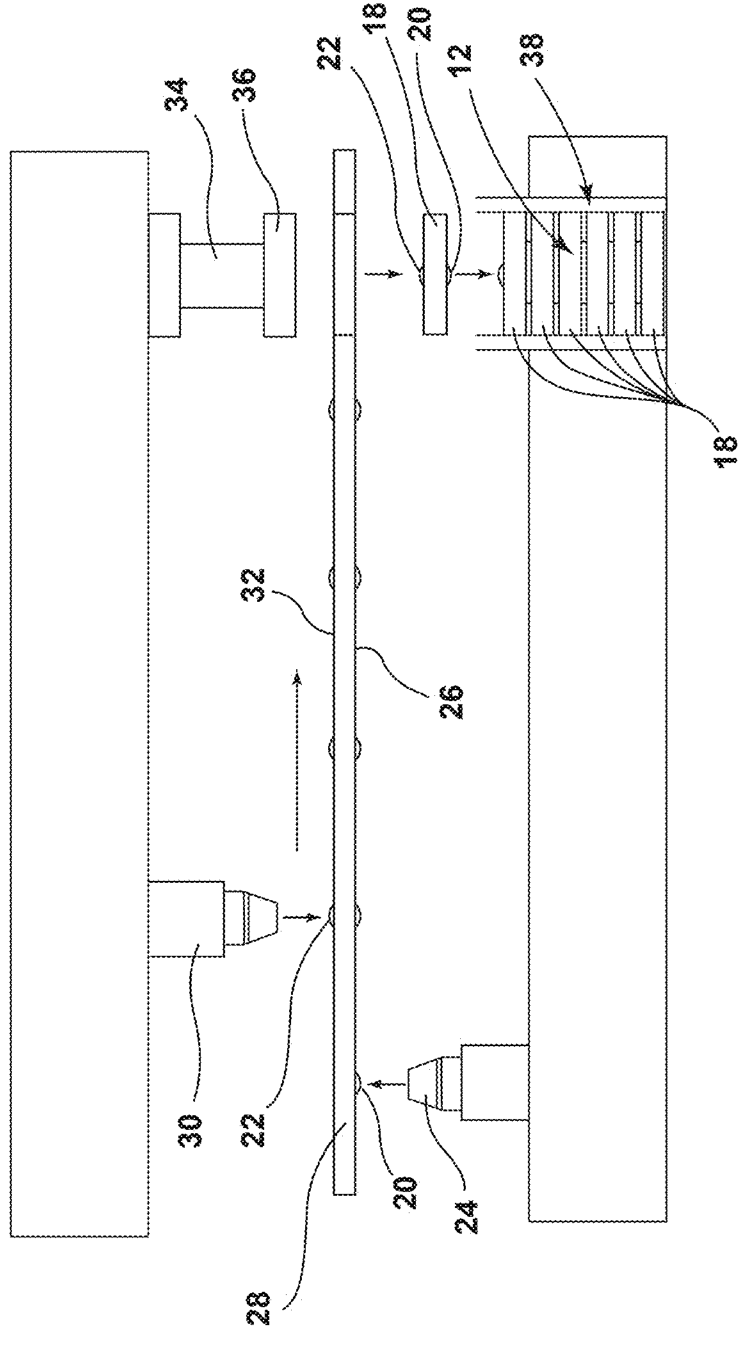
FIG. 2 is a side elevational view of a system for manufacturing a component of an electric motor, illustrating a metal sheet, an activator dispenser that applies activator to a first side of the metal sheet, an adhesive dispenser that applies adhesive to a second side of the metal sheet, a punch that is configured to punch out laminations from the metal sheet, and a choke that is configured to receive punched-out laminations in a stack, according to one embodiment.

Referring now to FIG. 2, in various implementations, the metal laminations 18 of the component 12 of the electric motor 10 are adhered to each other. For example, adjacent metal laminations 18 can be adhered to each other by adhesive 20. In some implementations, adjacent metal laminations 18 of the component 12 of the electric motor 10 are adhered to each other by adhesive 20 that is activated by an activator 22. For example, the adhesive 20 and activator 22 may be applied to opposing sides of adjacent metal laminations 18, such that the adhesive 20 and activator 22 come in contact with each other to activate the adhesive 20 and adhere the adjacent metal laminations 18 to each other. A variety of types of adhesives 20 and activators 22 with various compositions are contemplated, as described further herein.

Referring still to FIG. 2, a system for manufacturing the component 12 of the electric motor 10 is illustrated. The system includes an adhesive dispenser 24. The adhesive dispenser 24 applies doses of adhesive 20 to a first side 26 of a metal sheet 28. The system further includes an activator dispenser 30. The activator dispenser 30 applies doses of activator 22 to a second side 32 of the metal sheet 28 that is opposite the first side 26. The system may include an apparatus for cutting out metal laminations 18 from the metal sheet 28, such as a punch 34 having a die or cutter 36 coupled thereto that is configured to punch out a plurality of metal laminations 18 from the metal sheet 28. As illustrated in FIG. 2, in operation of the system, the metal sheet 28 is moved toward the punch 34 from the adhesive dispenser 24 and the activator dispenser 30. As such, adhesive 20 and activator 22 are applied to a portion of the metal sheet 28 and that portion of the metal sheet 28 is subsequently delivered to the punch 34, wherein the portion is punched out of the metal sheet 28, forming the metal lamination 18 having adhesive 20 on the first side 26 and activator 22 on the second side 32. It is contemplated that a variety of types of devices may be utilized by the system to move the metal sheet 28 during operation of the system (e.g., conveyor, rollers, etc.).

As illustrated in FIG. 2, the system includes a choke 38 that is configured to receive a plurality of the metal laminations 18 in a stacked configuration. In the stacked configuration within the choke 38, the metal laminations 18 are oriented, such that the first side 26 of one metal lamination 18 that has adhesive 20 applied thereto interfaces with the second side 32 of an adjacent metal lamination 18 that has activator 22 applied thereto. As such, the adhesive 20 and the activator 22 contact each other, which activates the adhesive 20, adhering the metal laminations 18 together. In various implementations, the stack of adhered metal laminations 18 cure together while in the choke 38.

In various implementations, the adhesive 20 is an acrylic adhesive 20. The acrylic adhesive 20 may be a toughened acrylic adhesive 20. In various implementations, the acrylic adhesive 20 contains at least one of butadiene rubber toughener and polyurethane methacrylate. In some embodiments, the adhesive 20 contains polyurethane methacrylate in an amount of from about 1 to about 30 percent by weight. In some embodiments, the adhesive 20 contains polyurethane methacrylate in an amount of from about 10 to about 30 percent by weight. In some embodiments, the adhesive 20 contains polyurethane methacrylate in an amount of from about 20 to about 30 percent by weight. In some embodiments, the adhesive 20 contains polyurethane methacrylate in an amount of about 30 percent by weight.

In some embodiments, the adhesive 20 contains butadiene rubber toughener in an amount of from about 1 to about 20 percent by weight. In some embodiments, the adhesive 20 contains butadiene rubber toughener in an amount from about 10 to about 20 percent by weight. In some embodiments, the adhesive 20 contains butadiene rubber toughener in an amount of about 20 percent by weight. It is contemplated that the acrylic adhesive 20 can contain the polyurethane methacrylate and/or the butadiene rubber toughener in the aforementioned percent-by-weight amounts. It is contemplated that various types of activators 22 that are configured to activate the adhesive 20 may be utilized. For example, Permabond® Initiator 41 may be utilized in some embodiments. In an exemplary embodiment, the adhesive 20 may be Permabond® TA 439 and the activator 22 may be Permabond® Initiator 41. In another exemplary embodiment, the adhesive 20 may be Loctite® AA 331 and the activator 22 may be Loctite® SF 7387™.

Figure 3:
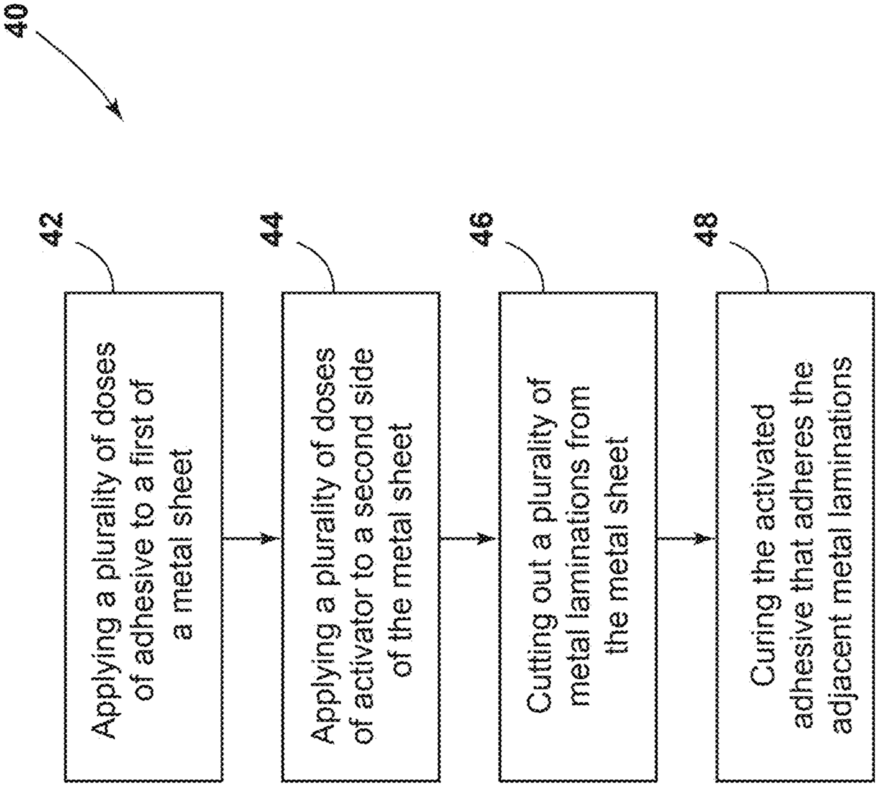
FIG. 3 is a flow diagram of a method of manufacturing a component of an electric motor, according to one embodiment.

Referring now to FIG. 3, a method 40 of manufacturing a component 12 of an electric motor 10 includes a step 42 of applying a plurality of doses of adhesive 20 to a first side 26 of a metal sheet 28. In various implementations, the adhesive 20 that is applied to the first side 26 of the metal sheet 28 is an acrylic adhesive 20. The acrylic adhesive 20 can contain at least one of butadiene rubber toughener and polyurethane methacrylate. The acrylic adhesive 20 can contain the butadiene rubber toughener and/or the polyurethane methacrylate in amounts corresponding with the aforementioned percentages by weight described above.

The method 40 of manufacturing the component 12 of the electric motor 10 can further include a step 44 of applying a plurality of doses of activator 22 to a second side 32 of the metal sheet 28 opposite the first side 26. The activator 22 applied to the second side 32 of the metal sheet 28 can be one or more of a variety of types of activators 22 configured to activate the acrylic adhesive 20 applied to the first side 26 of the metal sheet 28 in step 42. In various implementations, the first side 26 of the metal sheet 28 faces downward, and the second side 32 of the metal sheet 28 faces upward. As such, doses of adhesive 20 are applied upward onto an underside of the metal sheet 28 at step 42, and doses of activator 22 are applied to the top side of the metal sheet 28 at step 44, as illustrated in FIG. 2.

Referring still to FIG. 3, the method 40 of manufacturing a component 12 of an electric motor 10 can include a step 46 of cutting out a plurality of metal laminations 18 from the sheet metal 28. In various implementations, the metal laminations 18 include a dose of adhesive 20 on the first side 26 of the lamination 18 and a dose of activator 22 on the second side 32 of the lamination 18. As such, the plurality of metal laminations 18 are stacked within the choke 38 and each metal lamination 18 is adhered to at least one adjacent metal lamination 18 by the adhesive 20 activated by the activator 22. In various implementations, the step 46 of cutting out a plurality of metal laminations 18 comprises punching out the metal laminations 18 via the punch 34. A variety of ways of cutting out the metal laminations 18 are contemplated.

Referring still to FIG. 3, the method 40 of manufacturing the component 12 of an electric motor 10 can include a step 48 of curing the activated adhesive 20 that adheres the adjacent metal laminations 18. In various implementations, the step 48 of curing the activated adhesive 20 occurs while the plurality of metal laminations 18 are stacked within the choke 38. In some embodiments, the composition of the acrylic adhesive 20 and the composition of the activator 22 are such that curing is substantially completed within one minute of the adhesive 20 being activated by the activator 22. It is contemplated that a variety of types of components 12 of the electric motor 10 may be manufactured via the method 40. For example, the stator core 14 of the electric motor 10 and/or the rotor 16 of the electric motor 10 may be manufactured via the method 40.

The component 12 of the electric motor 10 and the method 40 of manufacturing the component 12 of the electric motor 10 described in the present disclosure may provide a variety of advantages. First, the acrylic adhesive 20 containing butadiene rubber toughener and/or polyurethane methacrylate results in adhesive 20 that, when activated, cures exceptionally quickly, and enhances tensile strength of the adhesive 20. For example, testing of stacked metal lamination rotors 16 via an Instron® tensile tester machine that attempts to apply axial ("axial" in the sense of along an axis about which the stacked lamination rotor is configured to rotate about) tension to the rotor 16 demonstrated superior results relative to traditional adhesives. Second, the adhesive 20 being applied to the underside of the metal sheet 28 and the activator 22 being applied to the top side of the metal sheet 28 ensures that the die coupled to the punch does not come into contact with the adhesive 20.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

- 10 electric motor
- 12 component
- 14 stator core
- 16 rotor
- 18 lamination/metal laminations
- 20 adhesive
- 22 activator
- 24 adhesive dispenser
- 26 first side
- 28 metal sheet
- 30 activator dispenser
- 32 second side
- 34 punch
- 36 die or cutter
- 38 choke
- 40 method
- 42 step of applying a plurality of doses of adhesive
- 44 step of applying a plurality of doses of activator
- 46 step of cutting out a plurality of metal laminations
- 48 step of curing the activated adhesive

What is claimed is:

1. A method of manufacturing a component of an electric motor, comprising the steps of:

applying a plurality of doses of adhesive to a first side of a metal sheet, wherein the adhesive is an acrylic adhesive that contains at least one of butadiene rubber toughener and polyurethane methacrylate;

applying a plurality of doses of activator to a second side of the metal sheet opposite the first side;

cutting out a plurality of metal laminations from the metal sheet, each of which includes a dose of adhesive on the first side of the lamination and a dose of activator on the second side of the lamination, such that the plurality of metal laminations are stacked within a choke and each metal lamination is adhered to at least one adjacent metal lamination by the adhesive activated by the activator; and curing the plurality of metal laminations within the choke to produce the component, and wherein the metal sheet is formed of a monolithic sheet metal such that each of the plurality of metal laminations is formed of a monolithic sheet metal.

2. The method of claim 1, wherein the first side of the metal sheet faces downward, and the second side of the metal sheet faces upward.

3. The method of claim 1, wherein the adhesive contains polyurethane methacrylate in an amount of from about 1 to about 30 percent by weight.

4. The method of claim 3, wherein the adhesive contains polyurethane methacrylate in an amount of from about 10 to about 30 percent by weight.

5. The method of claim 4, wherein the adhesive contains polyurethane methacrylate in an amount of from about 20 to about 30 percent by weight.

6. The method of claim 5, wherein the adhesive contains polyurethane methacrylate in an amount of about 30 percent by weight.

7. The method of claim 1, wherein the adhesive contains butadiene rubber toughener in an amount of from about 1 to about 20 percent by weight.

8. The method of claim 7, wherein the adhesive contains butadiene rubber toughener in an amount from about 10 to about 20 percent by weight.

9. The method of claim 8, wherein the adhesive contains butadiene rubber toughener in an amount of about 20 percent by weight.

10. The method of claim 1, wherein the component of the electric motor is at least a portion of a rotor.

11. The method of claim 1, wherein the component of the electric motor is at least a portion of a stator core.

12. The method of manufacturing a component of an electric motor of claim 1, wherein the curing step is completed within one minute of the adhesive being activated by the activator.

13. A component of an electric motor of the method of claim 1, wherein the adhesive contains the butadiene rubber toughener in an amount of from about 1 to about 20 percent by weight.

14. The component of claim 13, wherein the adhesive contains butadiene rubber toughener in an amount from about 10 to about 20 percent by weight.

15. The component of claim 14, wherein the adhesive contains butadiene rubber toughener in an amount of about 20 percent by weight.

16. The component of claim 13, wherein the adhesive contains polyurethane methacrylate in an amount of from about 1 to about 30 percent by weight.

17. The component of claim 13, wherein the component of the electric motor is a stator core.

18. The component of claim 13, wherein the component of the electric motor is a rotor.

19. A component of an electric motor of the method of claim 1, wherein the adhesive contains the polyurethane methacrylate in an amount of from about 1 to about 30 percent by weight.

20. The component of claim 19, wherein the adhesive contains polyurethane methacrylate in an amount of from about 10 to about 30 percent by weight.

* * * * *